Patented Dec. 18, 1928.

1,695,489

UNITED STATES PATENT OFFICE.

GEORGE S. HEWETT, OF CORNING, CALIFORNIA.

PROCESS OF CURING RIPE OLIVES.

No Drawing.   Application filed December 28, 1925. Serial No. 78,000.

This invention relates to improvements in treating ripe olives, and is particularly directed to a process for curing the same in such a manner as to retain within the cured olives their natural oils and flavor.

A further object is to provide a process whereby the cured olives can be packed and marketed dry without the necessity of canning them in brine or like solutions.

A still further object is to render the olives when finally cured very palatable, crisp, yet tender, and not tough or leathery.

These objects I accomplish by subjecting the olives to the process or treatment described in detail in the following specification and claims.

In carrying out my improved process I first place the olives in a brine solution containing sodium chloride and water in the proportions of one-half pound of sodium chloride to one gallon of water. The olives are held in this solution until fermentation sets in.

The olives are then removed from this initial solution and are placed in a solution of lye, sodium chloride and water made up in the proportions of two and one-half ounces of lye and two and one-half ounces of sodium chloride and one gallon of water. The olives are held in this latter solution for a period of approximately forty-eight hours.

If, after being held in this solution for that period of time the bitter taste is not removed from the olives they are then washed in cold water, and a new solution of lye, sodium chloride and water in the same proportions above stated is then prepared and the olives immersed therein and allowed to remain therein until the bitter taste is removed therefrom.

When the bitter taste is entirely removed from the olives they are then washed and soaked in cold water until all traces of the lye and salt are removed.

I then prepare a brine solution containing sodium chloride and water in the proportions of one-half pound of salt to one gallon of water and the olives are immersed in this latter solution and allowed to stand therein for a period of forty-eight hours. The solution is then drained from the olives and the olives are dehydrated by any desired or known method until they are thoroughly dry. They are then plunged into a boiling hot brine solution, which solution is made up of sodium chloride and water in the proportion of one quarter pound of the sodium chloride to one gallon of water. The olives are held in this boiling brine for a period of approximately one minute, and are then removed and placed in an oven where they are subjected to heat of approximately 300 degrees Fahrenheit. This heat is gradually increased until it reaches 450 degrees Fahrenheit. When this degree of heat is reached the olives are allowed to remain subject thereto for a period of from twenty to thirty minutes or until they are crisp. They are then removed from the oven and while hot are dusted with fine sodium chloride in the proportions of about one quarter pound of sodium chloride to one gallon of olives.

I have found that by subjecting the olives to the several steps here enumerated that they are first relieved of any of their bitter taste, and then by subjecting them to the saline solutions, cold and hot as indicated, and then heating them until they are thoroughly crisp, and at the high degree of heat noted, all of the natural oils and flavor is retained, while at the same time the olives are sufficiently cured and sterilized so as to keep and be marketable in a dry crisp state, at the same time being tender and very palatable and capable of keeping indefinitely in any climate.

While I have described in detail the exact steps and percentages of ingredients used in connection with my improved process, still in practice it is possible that slight deviations from that detail may be resorted to without departing from the spirit of the invention, as defined by the appended claims.

Having thus described my invention, what I claim as new and useful and desire to secure by Letters Patent is:

1. The herein described process of treating olives from which the natural bitterness has been removed comprising immersing them in a boiling brine, removing them from the boiling brine and subjecting them to a high heat until crisp.

2. The herein described process of treating ripe olives from which the natural bitterness has been removed consisting in immersing them for about one minute in a boiling saline solution, and then removing them from such solution and subjecting them to a heat ranging above 300 degrees Fahrenheit and gradually increasing to 450 degrees Fahrenheit for from twenty to thirty minutes.

3. The herein described process of treating ripe olives from which the natural bitterness has been removed consisting in immersing them for about one minute in a boiling saline solution, then removing them from such solution and subjecting them to a heat ranging above 300 degrees Fahrenheit and gradually increasing to 450 degrees Fahrenheit for from twenty to thirty minutes, and then dusting them with sodium chloride.

4. The herein described method of treating olives consisting in first immersing the olives in a cold brine solution for a predetermined period, then dehydrating them, then plunging them momentarily into a hot brine solution and removing them therefrom and subjecting them to a high heat until crisp.

In testimony whereof I affix my signaure.

GEORGE S. HEWETT.